Jan. 29, 1935. L. F. LAMPLOUGH Re. 19,444
METHOD OF AND APPARATUS FOR VULCANIZING MATERIAL ON ARTICLES
Original Filed Dec. 3, 1930
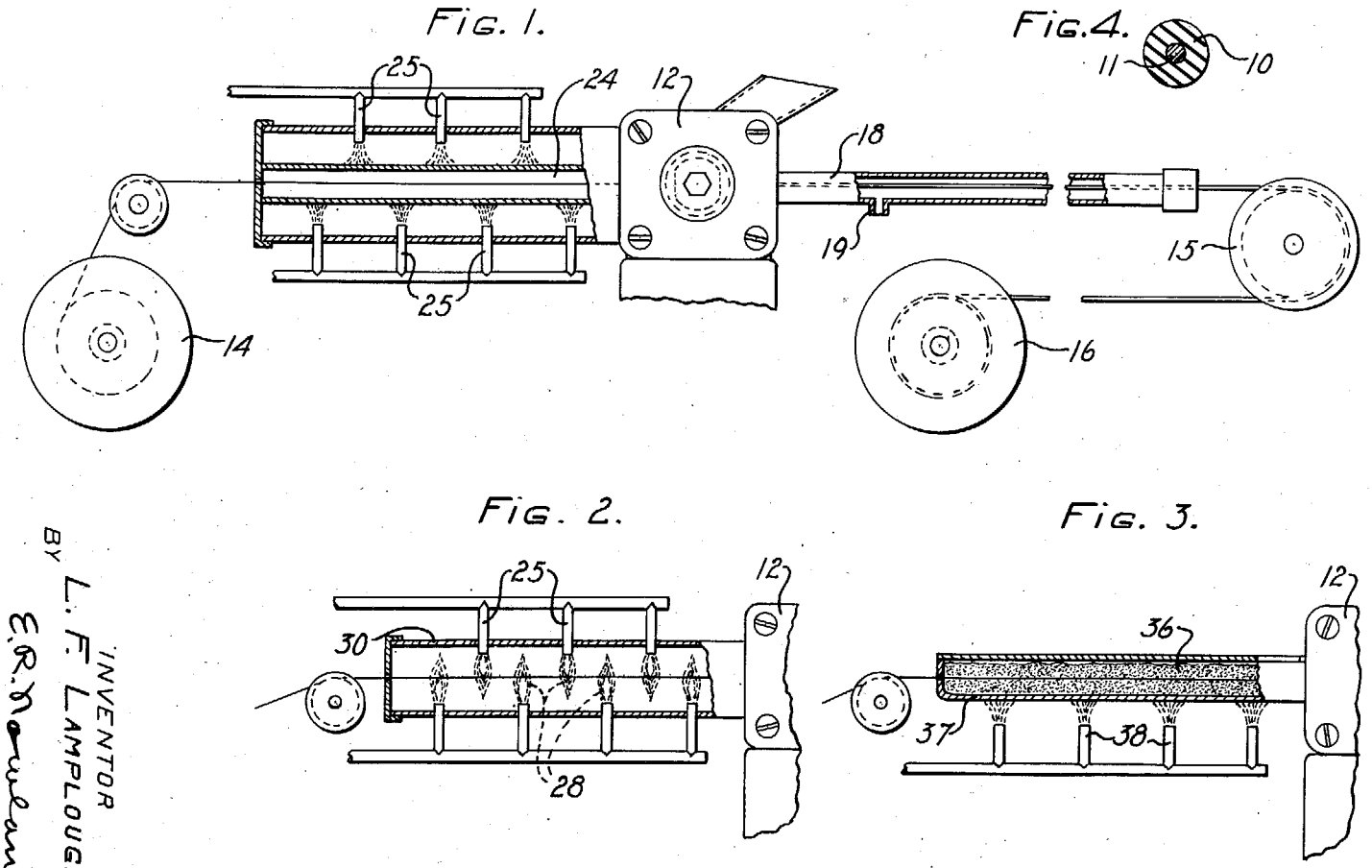
INVENTOR
L. F. LAMPLOUGH
BY E. R. Rowlan
ATTORNEY Reissued Jan. 29, 1935

Re. 19,444

UNITED STATES PATENT OFFICE 19,444

METHOD OF AND APPARATUS FOR VULCANIZING MATERIAL ON ARTICLES

Leslie Fawcett Lamplough, Baltimore, Md., assignor to Western Electric Company, Incorporated, New York, N. Y., a corporation of New York Original No. 1,978,586, dated October 30, 1934, Serial No. 499,656, December 3, 1930. Application for reissue November 6, 1934, Serial No. 751,765

29 Claims. (Cl. 18—6)

This invention relates to methods of and apparatus for vulcanizing material on articles, and more particularly to methods of and apparatus for vulcanizing a rubber insulation on wire.

Objects of the invention are to improve, simplify and expedite the vulcanization of materials on articles.

The invention contemplates the provision of a method of and apparatus for vulcanizing materials on articles, wherein the article is heated immediately before the vulcanizable material is applied thereto, and all or a portion of the heat necessary to induce vulcanization is obtained by conduction from the heated article. In one embodiment of the invention, a rubber insulation is vulcanized on wire by pre-heating the wire and then extruding a covering of uncured rubber compound thereon, the covering being vulcanized on the wire by heat conducted from the heated wire. Any necessary additional heat to induce vulcanization may be obtained by subjecting the applied covering to a controlled heating medium, such as steam under pressure.

It is believed that a complete understanding of the invention will be had from the following detailed description, when read in conjunction with the accompanying drawing, wherein Fig. 1 is a diagrammatic elevational view, partly in section, of one form of apparatus embodying the features of the invention and by means of which the improved method may be practiced;

Figs. 2 and 3 are fragmentary sectional views showing other forms of apparatus embodying the invention, and Fig. 4 is an enlarged cross sectional view of a wire having a rubber insulating covering vulcanized thereon in accordance with the present invention.

In the accompanying drawing, one embodiment of the invention is diagrammatically illustrated in conjunction with an apparatus for continuously applying and vulcanizing a rubber insulating covering 10 (Fig. 4) on an electrical conductor or wire 11. The apparatus comprises an insulating head 12 of any suitable type adapted to extrude or otherwise apply under pressure a continuous uniform covering of a plastic rubber compound on the wire as it is drawn through the insulating head from a supply reel 14. The rubber insulated wire passes around a capstan 15 which delivers it to a take-up reel 16, the capstan being driven, by means not shown, at a predetermined speed which is coordinated with the extruding speed of the insulating head 12.

In accordance with the present invention, the wire is heated to a predetermined temperature immediately before the rubber compound is applied thereto, whereby all or a portion of the heat necessary to induce vulcanization in the rubber covering is obtained by conduction from the heated wire. When the heat conducted from the wire is insufficient to completely vulcanize the rubber covering, the necessary additional heat may be obtained by subjecting the covered wire to a controlled heating medium, such as steam under pressure. For example, when a relatively thick covering of rubber compound is applied on the wire, the heat conducted from the preheated wire may be sufficient to vulcanize only the layer or portion of the rubber compound immediately adjacent the wire. In such instances, the covered wire may be passed through an auxiliary vulcanizing chamber 18 (Fig. 1), wherein steam or any other suitable heating medium is admitted through an inlet 19, the heating medium in the chamber being maintained at a predetermined temperature and under a predetermined pressure as may be required to complete the vulcanization of the rubber covering.

Numerous methods may be employed for preheating the wire immediately before applying the rubber compound thereto. In the embodiment of the invention shown in Fig. 1, the wire is preheated by passing it through a heated chamber 24 immediately before it enters the insulating head 12. Any suitable means, such as one or more gas burners 25, may be employed for constantly maintaining a predetermined temperature within the chamber 24 to thereby insure the heating of the advancing wire to a predetermined temperature. The heated chamber 24 is preferably connected directly to the insulating head 12 so that the rubber compound is applied to the heated wire before the wire is exposed to the atmosphere.

In the embodiment of the invention illustrated in Fig. 2, the wire is pre-heated by passing it through one or more gas burner flames 28 immediately before the rubber compound is applied thereto. The gas flames may be enclosed in a chamber 30 adjoining the insulating head 12 so that the heated wire is not exposed to the atmosphere before the rubber compound is applied thereto.

In the embodiment of the invention shown in Fig. 3, the wire is pre-heated by passing it through a heated bath 36 of fine particles, such as sand or other suitable material contained in a container 37 adjoining the insulating head 12.

Any suitable means, such as one or more gas burners 38 may be employed for heating and maintaining the contents of the container 37 at a predetermined temperature.

In some instances, it may be desirable to treat the surface of the wire or impart a predetermined characteristic thereto before applying the rubber compound thereon in order to insure an intimate bond between the wire and the rubber covering. For example, it may be desirable to oxidize, de-oxidize, clean, roughen, smooth, or otherwise change a characteristic of the surface of the wire before applying the rubber covering thereto. This may be accomplished either before, during or immediately after the pre-heating of the wire. Thus, in the embodiment of the invention shown in Fig. 2, the surface of the wire may be oxidized or de-oxidized during the pre-heating process by employing oxidizing or reducing gas flames, respectively, in the heating chamber 30. In the embodiment of the invention shown in Fig. 3, the surface of the wire may be cleaned, roughened, or smoothed during the heating process according to the character of the material employed in the heating bath 36.

It is to be understood that the invention is not limited to the embodiments thereof herein illustrated and described, except in so far as is defined by the appended claims.

What is claimed is:

1. The method of forming and vulcanizing a covering on conductors which comprises the steps of charging the conductor with an amount of heat sufficient to effect vulcanization in vulcanizable material applied thereto, subsequently applying and forming a covering of a vulcanizable compound on the hot conductor and subsequently applying heat to the exterior surface of the covering to effect vulcanization therein from without.

2. The method of forming and vulcanizing a covering on conductors which comprises the steps of passing a conductor through a heated chamber to charge the conductor with an amount of heat sufficient to effect vulcanization from within in vulcanizable material applied thereto, subsequently applying and forming a covering of a vulcanizable compound on the hot conductor, and subsequently applying heat to the exterior surface of the covering to effect vulcanization therein from without.

3. In an apparatus for continuously applying and forming a covering of vulcanized material on conductors, means for continuously advancing a conductor, means to charge the conductor with an amount of heat sufficient to effect vulcanization from within in vulcanizable material applied thereto, means to continuously apply and form a covering of vulcanizable material on the hot conductor, and means to heat the exterior of the covering to effect vulcanization therein from without.

4. In an apparatus for continuously applying and forming a covering of vulcanized material on a conductor, means for continuously advancing a conductor, means to charge the conductor with an amount of heat sufficient to effect vulcanization from within in vulcanizable material applied thereto and to simultaneously modify the surface of the conductor, means to continuously apply and form a covering of vulcanizable material on the hot conductor, and means to heat the exterior of the covering to effect vulcanization therein from without.

5. In an apparatus for continuously applying and forming a covering of vulcanized material on a conductor, means for continuously advancing a conductor through the apparatus, an oven to charge the conductor with an amount of heat sufficient to effect vulcanization from within in vulcanizable material applied thereto, an extrusion press to apply and form a covering of vulcanizable material on the hot conductor, and a vulcanizing chamber to effect vulcanization in the covering from without.

6. In an apparatus for continuously applying and forming a covering of vulcanized material on a conductor, means for continuously advancing a conductor through the apparatus, an oven to charge the conductor with an amount of heat sufficient to effect vulcanization from within in vulcanizable material applied thereto, an extrusion press to apply and form a covering of vulcanizable material on the hot conductor, and a vulcanizing chamber to effect vulcanization in the covering from without, the said oven being internally heated by fuel flames through which the conductor passes.

7. In an apparatus for continuously applying and forming a covering of vulcanized material on a conductor, means for continuously advancing a conductor through the apparatus, an oven to charge the conductor with an amount of heat sufficient to effect vulcanization from within in vulcanizable material applied thereto, an extrusion press to apply and form a covering of vulcanizable material on the hot conductor, and a vulcanizing chamber to effect vulcanization in the covering from without, the said oven being internally heated by fuel flames of a chemically oxidizing nature through which the conductor passes.

8. In an apparatus for continuously applying and forming a covering of vulcanized material on a conductor, means for continuously advancing a conductor through the apparatus, an oven to charge the conductor with an amount of heat sufficient to effect vulcanization from within in vulcanizable material applied thereto, an extrusion press to apply and form a covering of vulcanizable material on the hot conductor, and a vulcanizing chamber to effect vulcanization in the covering from without, the said oven being internally heated by fuel flames of a chemically reducing nature through which the conductor passes.

9. In an apparatus for continuously applying and forming a covering of vulcanized material on a conductor, means for continuously advancing a conductor through the apparatus, an oven to charge the conductor with an amount of heat sufficient to effect vulcanization from within in vulcanizable material applied thereto, an extrusion press to apply and form a covering of vulcanizable material on the hot conductor, and a vulcanizing chamber to effect vulcanization in the covering from without, the said oven being externally heated and internally filled with material to modify the surface of the conductor passing therethrough.

10. The method of forming and vulcanizing a covering on a conductor which comprises the steps of passing a conductor through a heated atmosphere to modify the surface thereof and to simultaneously charge the conductor with an amount of heat sufficient to effect vulcanization from within in vulcanizable material applied thereto, subsequently applying and forming a covering of a vulcanizable compound on the hot conductor, and subsequently applying heat to the exterior surface of the covering to effect vulcanization therein from without.

11. The method of forming and vulcanizing a covering on a conductor which comprises the steps of passing a conductor through a heated atmosphere to modify the surface thereof chemically and to simultaneously charge the conductor with an amount of heat sufficient to effect vulcanization from within in vulcanizable material applied thereto, subsequently applying and forming a covering of a vulcanizable compound on the hot conductor, and subsequently applying heat to the exterior surface of the covering to effect vulcanization therein from without.

12. The method of forming and vulcanizing a covering on a conductor which comprises the steps of passing a conductor through a heated atmosphere to oxidize the surface thereof and to simultaneously charge the conductor with an amount of heat sufficient to effect vulcanization from within in vulcanizable material applied thereto, subsequently applying and forming a covering of a vulcanizable compound on the hot conductor, and subsequently applying heat to the exterior surface of the covering to effect vulcanization therein from without.

13. The method of forming and vulcanizing a covering on conductors which comprises the steps of passing a conductor through a heated atmosphere to reduce the surface thereof and to simultaneously charge the conductor with an amount of heat sufficient to effect vulcanization from within in vulcanizable material applied thereto, subsequently applying and forming a covering of a vulcanizable compound on the hot conductor, and subsequently applying heat to the exterior surface of the covering to effect vulcanization therein from without.

14. The method of forming and vulcanizing a covering on conductors which comprises the steps of passing a conductor through a heated atmosphere to modify the surface thereof mechanically and to simultaneously charge the conductor with an amount of heat sufficient to effect vulcanization from within in vulcanizable material applied thereto, subsequently applying and forming a covering of a vulcanizable compound on the hot conductor, and subsequently applying heat to the exterior surface of the covering to effect vulcanization therein from without.

15. A method of manufacturing a conductor with a covering of vulcanized material comprising the steps of charging the uncovered conductor with an amount of heat sufficient to effect vulcanization from within in vulcanizable material applied thereto, and subsequently applying and forming a covering of vulcanizable material on the hot conductor.

16. In an apparatus for continuously applying and forming a covering of vulcanized material on a conductor, means for continuously advancing a conductor, means to charge the conductor with an amount of heat sufficient to effect vulcanization from within in vulcanizable material applied thereto and to simultaneously chemically modify the surface of the conductor, means to continuously apply and form a covering of vulcanizable material on the hot conductor, and means to heat the exterior of the covering to effect vulcanization therein from without.

17. In an apparatus for continuously applying and forming a covering of vulcanized material on a conductor, means for continuously advancing a conductor, means to charge the conductor with an amount of heat sufficient to effect vulcanization from within in vulcanizable material applied thereto and to simultaneously oxidize the surface of the conductor, means to continuously apply and form a covering of vulcanizable material on the hot conductor, and means to heat the exterior of the covering to effect vulcanization therein from without.

18. In an apparatus for continuously applying and forming a covering of vulcanized material on a conductor, means for continuously advancing a conductor, means to charge the conductor with an amount of heat sufficient to effect vulcanization from within in vulcanizable material applied thereto and to simultaneously reduce the surface of the conductor, means to continuously apply and form a covering of vulcanizable material on the hot conductor, and means to heat the exterior of the covering to effect vulcanization therein from without.

19. In an apparatus for continuously applying and forming a covering of vulcanized material on a conductor, means for continuously advancing a conductor, means to charge the conductor with an amount of heat sufficient to effect vulcanization from within in vulcanizable material applied thereto and to simultaneously mechanically modify the surface of the conductor, means to continuously apply and form a covering of vulcanizable material on the hot conductor, and means to heat the exterior of the covering to effect vulcanization therein from without.

20. The method of insulating conductors, which comprises the steps of charging a conductor with an amount of heat sufficient to effect vulcanization of vulcanizable material applied thereto, subsequently extruding a covering of a vulcanizable compound on the hot conductor, then applying heat to the exterior of the covering to effect vulcanization therein from the exterior thereof, and continuously moving the conductor while carrying out the aforementioned steps.

21. The method of insulating conductors, which comprises continuously charging successive increments of a conductor with an amount of heat sufficient to effect vulcanization of vulcanizable material applied thereto, subsequently extruding a covering of a vulcanizable compound upon successive increments of the hot conductor, and then continuously applying heat to successive increments of the exterior of the covering to effect vulcanization of the covering material from the exterior thereof.

22. The method of insulating conductors, which comprises continuously passing a conductor through a heated zone to charge successive increments of the conductor with an amount of heat sufficient to effect vulcanization from within of vulcanizable material applied thereto, extruding a covering of a vulcanizable compound on the hot conductor, and then continuously advancing the covered conductor through a vulcanizing zone to effect vulcanization of the covering compound from the exterior thereof.

23. The method of insulating conductors, which comprises charging a conductor with a quantity of heat sufficient to effect vulcanization of vulcanizable material applied thereto, extruding a covering of a vulcanizable compound on the hot conductor, and continuously subjecting the coated conductor to a gaseous vulcanizable medium at a temperature sufficiently high to effect vulcanization of the covering from the exterior thereof.

24. The method of insulating conductors, which comprises charging a conductor with a quantity of heat sufficient to effect vulcanization of vulcanizable material applied thereto, immediately thereafter extruding a covering of a vulcanizable compound on the hot conductor, and then continuously subjecting successive increments of the coated conductor to steam at a temperature and under pressure sufficient to effect vulcanization of the compound from the exterior thereof.

25. In an apparatus for continuously insulating a conductor, means to charge the conductor with an amount of heat sufficient to effect vulcanization of vulcanizable material applied thereto, means to continuously extrude a covering of vulcanizable material on the hot conductor, a vulcanizing chamber for treating the material with a hot vulcanization medium under pressure, and means for continuously advancing the conductor through each of the aforementioned means.

26. In an apparatus for continuously insulating a conductor, an oven to charge the conductor with an amount of heat sufficient to effect vulcanization of vulcanizable material applied thereto, an extrusion press for covering the hot conductor with a vulcanizable compound, a vulcanizing chamber adjacent the extrusion press, means for continuously advancing the conductor through the vulcanizing chamber, and means for admitting a hot vulcanizing medium under pressure into the vulcanizing chamber.

27. In an apparatus for continuously insulating a conductor, an oven to charge the conductor with an amount of heat sufficient to effect vulcanization of vulcanizable material applied thereto, an extrusion press for covering the hot conductor with a vulcanizable compound, a vulcanizing chamber adjacent the extrusion press, means for continuously advancing the conductor through each of the aforementioned parts of the apparatus, and means for admitting steam under pressure into the vulcanizing chamber in direct contact with the vulcanizable compound whereby vulcanization is effected in said compound from the exterior thereof.

28. The method of insulating conductors, which comprises charging a conductor with an amount of heat sufficient to effect partial vulcanization of a given quantity of vulcanizable material, applying the aforesaid quantity of vulcanizable material as a covering upon the hot conductor, and applying additional heat to the exterior of the covering whereby the vulcanizable material is completely vulcanized by heat applied to the interior and exterior surfaces thereof.

29. The method of insulating conductors, which comprises continuously charging successive increments of a conductor with an amount of heat sufficient to effect partial vulcanization of a given quantity of vulcanizable material, subsequently extruding the aforesaid quantity of vulcanizable material as a covering upon the hot conductor, and then continuously applying additional heat to successive increments of the exterior of the covering whereby the vulcanizable material is completely vulcanized by heat applied to the interior and exterior surfaces thereof.

LESLIE FAWCETT LAMPLOUGH.